United States Patent
Muthulingam et al.

(10) Patent No.: US 7,587,568 B2
(45) Date of Patent: Sep. 8, 2009

(54) METHOD AND SYSTEM OF RECLAIMING STORAGE SPACE IN DATA STORAGE SYSTEMS

(75) Inventors: Sujatha Muthulingam, Mountain View, CA (US); Alex Tsukerman, Foster City, CA (US); Vishwanath Karra, San Jose, CA (US); Nicholas Whyte, Mercer Island, WA (US)

(73) Assignee: Oracel International Corporation, Redwood Shores, CA (US)

( * ) Notice: Subject to any disclaimer, the term of this patent is extended or adjusted under 35 U.S.C. 154(b) by 412 days.

(21) Appl. No.: 10/877,158

(22) Filed: Jun. 24, 2004

(65) Prior Publication Data
US 2005/0055492 A1  Mar. 10, 2005

Related U.S. Application Data

(60) Provisional application No. 60/500,467, filed on Sep. 5, 2003.

(51) Int. Cl.
*G06F 13/00* (2006.01)
*G06F 13/28* (2006.01)

(52) U.S. Cl. .................................................. 711/165
(58) Field of Classification Search .................. 711/165
See application file for complete search history.

(56) References Cited

U.S. PATENT DOCUMENTS

| | | | |
|---|---|---|---|
| 5,463,776 A | 10/1995 | Voigt et al. | |
| 5,652,883 A * | 7/1997 | Adcock | ....................... 707/206 |
| 5,713,002 A | 1/1998 | Zbikowski et al. | |
| 6,233,666 B1 | 5/2001 | Mathews et al. | |
| 6,606,658 B1 | 8/2003 | Uematsu | |
| 6,732,124 B1 | 5/2004 | Koseki et al. | |
| 6,738,875 B1 | 5/2004 | Wang | |
| 2002/0055941 A1* | 5/2002 | Kolodner et al. | ............. 707/200 |
| 2003/0220951 A1 | 11/2003 | Muthulingam et al. | |
| 2004/0078381 A1* | 4/2004 | Blandy et al. | ............... 707/101 |

OTHER PUBLICATIONS

Oracle Corporation "Oracle8i Administrator's Guide, Release 2 (8.1.6)", Dec. 1999, Title page, Chapter 16 (pp. 1-12), Oracle Corporation, Redwood City, CA.

* cited by examiner

*Primary Examiner*—Matt Kim
*Assistant Examiner*—Edward J Dudek
(74) *Attorney, Agent, or Firm*—Vista IP Law Group, LLP (57) ABSTRACT

A method and system of reclaiming storage space in data storage systems is disclosed. In one embodiment, a high water mark of a data container is adjusted after data in the data container is compacted. As a result, unused space in the data container can be reclaimed.

61 Claims, 5 Drawing Sheets

METHOD AND SYSTEM OF RECLAIMING STORAGE SPACE IN DATA STORAGE SYSTEMS

CROSS-REFERENCE TO RELATED APPLICATIONS

The present application claims the benefit of U.S. Provisional Application Ser. No. 60/500,467, filed Sep. 5, 2003, which is hereby incorporated by reference in its entirety for all purposes as if fully set forth herein.

BACKGROUND AND SUMMARY

The present invention is related to data storage systems. More particularly, the present invention is directed to a method and system of reclaiming storage space in data storage systems.

Data storage systems utilize various mechanisms to identify available storage space. One approach is to maintain a "high water mark" to indicate a boundary between the portion of a data container that is unavailable, i.e., has been allocated for storage, and the portion of the data container that is available, i.e., has not been allocated for storage. The "high water mark" may be a pointer to the most recently allocated space in the data container. This mechanism optimizes the efficiency of allocating space by making it easy to locate available storage space.

The "high water mark" mechanism, however, may result in less efficient use of storage space in data storage systems because data objects that are initially very large frequently shrink in size. For example, a table that starts out with 1 million rows may end up with only a few hundred rows after several transactions. As a result, much of the storage space allocated for the table will be left unused. Since the "high water mark" only moves in one direction, the newly freed storage space below the "high water mark" will not be available to store other data objects as the system assumes that available storage space can only be found above the "high water mark."

Having data containers with unused storage space scattered throughout can impact the performance of scans and DML (Data Manipulation Language) operations. Scans may be affected because the amount of storage space read may not be proportional to the data retrieved. In addition, the length of time it takes for a scan to complete may also impact various operations that are scan-based.

In OLTP (Online Transaction Processing) systems, large tables called staging tables are often used for staging data. For example, data may be inserted into the staging tables for pickling. Pickling is a process of transforming data from a source representation to a uniform target representation. A large amount of the data in the staging tables is frequently deleted after pickling. The space that has been allocated for the staging tables, however, may remain unavailable to other objects for a considerable period of time after the data has been deleted.

One method of making available, i.e., reclaiming, unused storage space in an existing data container that is below the "high water mark" is to create a new data container, allocate storage space for objects in the existing data container in the new data container, move those objects to the new data container, and delete the existing data container. This solution, however, requires extra storage space. Hence, additional equipment, e.g., data storage devices, disk drives, etc., may need to be purchased. In addition, the objects may be offline; i.e., inaccessible, during the reclamation process, which may not be acceptable to end-users. Furthermore, dependent objects may have to be recreated as a result of the reclamation process.

Thus, it is desirable to provide a method and system where unused storage space in data containers can be reclaimed in place, i.e., without requiring extra storage space, where concurrency is preserved (i.e., objects in the data containers remain accessible during the reclamation process), and where data dependencies are maintained.

The present invention provides a method and system of reclaiming storage space in data storage systems. In one embodiment, data in a data container is compacted. A high water mark of the data container is then adjusted and unused space in the data container is reclaimed.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Reclamation of storage space in data storage systems is disclosed. Rather than move data in an existing data container into a new data container in order to reclaim unused storage space below a high water mark of the existing data container, unused storage space in the existing data container is reclaimed by compacting its content, which isolates the unused storage space in the existing data container, and adjusting the high water mark of the existing data container to exclude the emptied storage space. This allows for reclamation of freed storage space without needing to create a new data container, which requires extra storage space. In addition, concurrency of access and data dependencies can be maintained as well.

Data containers into which data is to be inserted may exist at any level of granularity. For example, a data container may be a table space, a file, a segment, a data block, or a row. A data storage system, at the finest level of granularity, may store data in rows. The rows, in turn, may be stored in one or more data blocks. Each data block may correspond to a specific number of bytes of physical space on a data storage device, e.g., a disk drive, etc. The next level of space is an extent. An extent may be a specific number of contiguous data blocks. Segments are the next level of granularity. Each segment may include one or more extents. Although in the following description, for purposes of explanation, specific types or granularity of data containers are set forth in order to provide a thorough understanding of the invention, the present invention is not limited to any particular type or granularity of data container.

Figure 1:
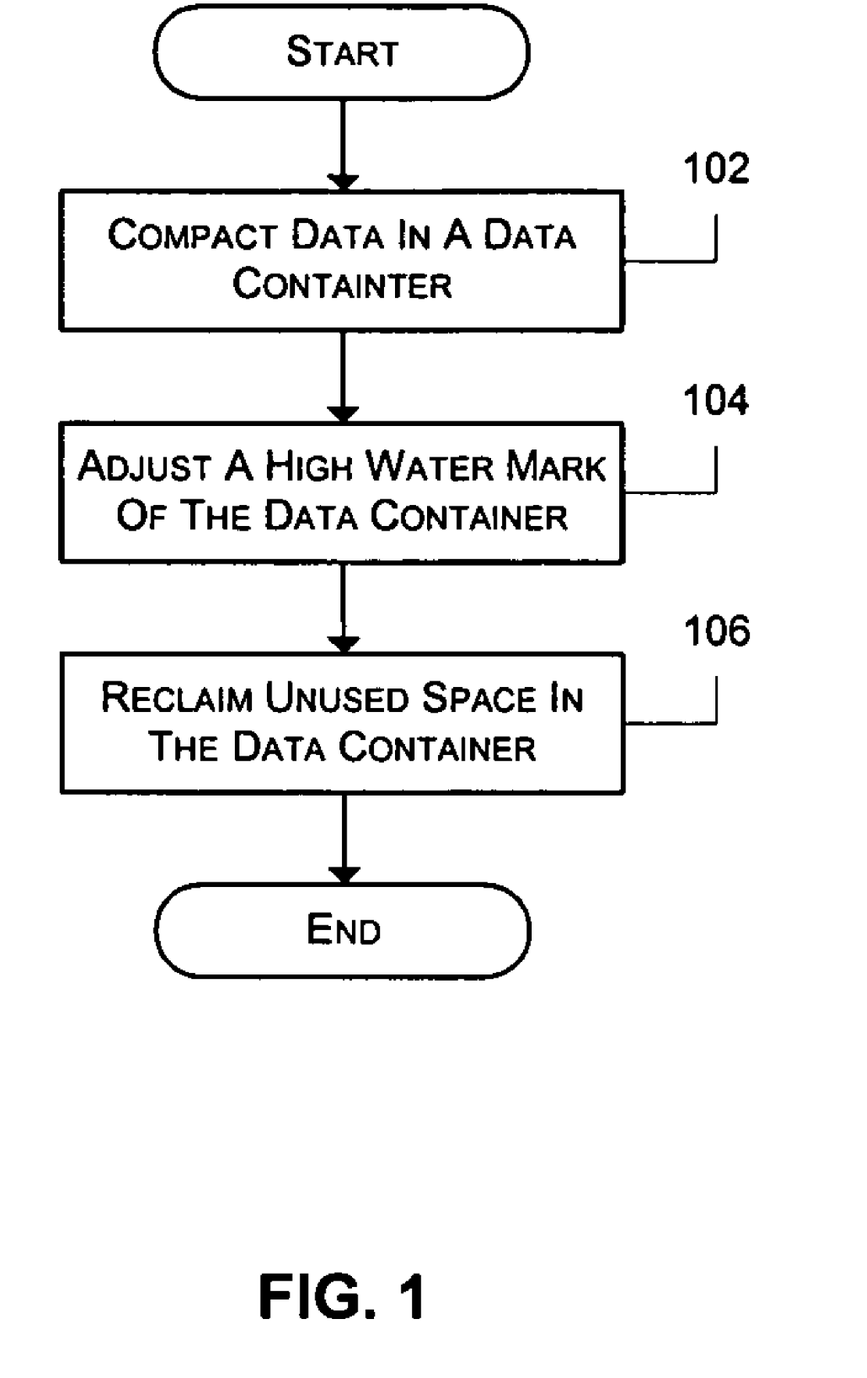
FIG. 1 illustrates a process flow of a method of reclaiming storage space in data storage systems according to an embodiment of the invention.

Illustrated in FIG. 1 is a method of reclaiming storage space in data storage systems according to an embodiment of the invention. At 102, data in a data container is compacted. In one embodiment, the data is compacted away from a high water mark of the data container. As a result, unused space in the data container will be aligned at the high water mark end of the data container. At 104, the data container's high water mark is adjusted to make the emptied space reclaimable. Finally, at 106, unused space in the data container is reclaimed. In one embodiment, only one command needs to be issued to start the reclamation process.

Figure 2:
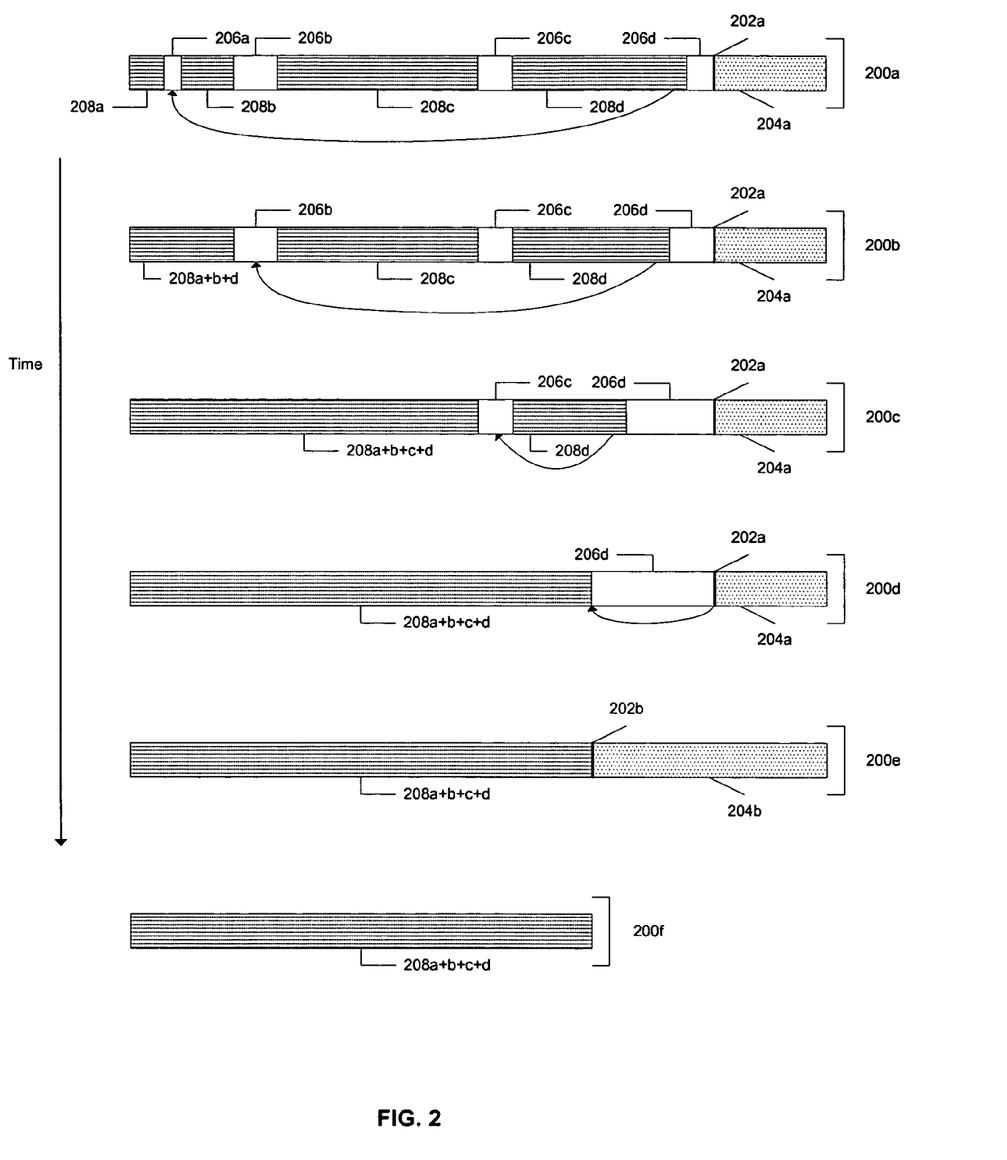
FIG. 2 shows an example of how storage space in a data container is reclaimed according to one embodiment of the invention.

FIG. 2 shows an example of how storage space is reclaimed in a data storage system according to one embodiment of the invention. In the example, a data container 200 includes a high water mark 202, a reclaimable space 204, four unused spaces 206a-206d, and four in-use spaces 208a-208d. Unused spaces are those spaces that had been allocated for storage, but have since been emptied or freed, i.e., spaces that do not contain data. In-use spaces are those spaces that are still currently occupied, i.e., spaces that contain data.

As the reclamation process proceeds, data in in-use space 208d, which is closest to high water mark 202a is moved to unused space 206a, which is farthest from high water mark 202a. Filling in unused space 206a frees up new space at high water mark's 202a end of data container 200. In the embodiment, unused space 206d expands as a result of the data movement.

Data in data container 200 remains online, i.e., accessible to users, when relocation of data is carried out transactionally. For example, a piece of data in space 208d can be inserted into space 206a before the same piece of data in space 208d is deleted. In one embodiment, a piece of data in space 208d may be deleted first before the piece of data is inserted into space 206a. For those embodiments, if movement of data is done incrementally, e.g., a row or a block at a time, other rows or blocks of data will remain accessible even when one row or block of data is locked. Thus, optimal concurrency can still be maintained.

In an embodiment, the granularity in which data is relocated depends upon the granularity at which the data storage system maintains data integrity. For example, if a data storage system maintains integrity at the row level, then data is moved on a row by row basis. Additionally, since data can be relocated using typical functions of the data storage system, e.g., insert operation, delete operation, etc., inherent maintenance functions in the system can automatically preserve the integrity of the data, e.g., data dependencies, indexes, constraints, triggers, etc., being moved. Moreover, because the relocation process uses typical data storage system functions, the process is recoverable, can be rolled back, etc.

Once unused space 206a is filled, shown in FIG. 2 as data container 200b, contents remaining in space 208d are moved to unused space 206b. In the embodiment, data is moved from the end closest to high water mark 202a to the end farthest from high water mark 202a until all of the unused spaces between in-use spaces are filled. In other words, all of the data will be at one end of data container 200, and all of the unused or free space will be at the other end of data container 200, shown in FIG. 2 as data container 200d.

As shown in FIG. 2, data in space 208d need not be relocated into the same unused space. Data from space 208d were moved into three different unused spaces 206a-206c. Additionally, less than all of the data in space 208d were moved since unused spaces 206a-206c differed in size from space 208d and could not accommodate all of the data from space 208d. In other embodiments, when the data being moved cannot be moved to random locations or out of order, such as an index, the data will be moved, in order, into one location.

Scans and DML (Data Manipulation Language) operations may run in parallel with the data movement phase. Searches for space by DML operations may be synchronized with searches for unused space during the data movement phase. DML operation searches for space may attempt to optimize the search path by caching addresses of spaces where data has been successfully inserted. If those spaces are close to high water mark 202a, then the progress made by the data movement phase may be countered. Hence, spaces being emptied that are near high water mark 202a may be marked with a state that would discourage future use of the emptied spaces, e.g., prevent inserts from happening.

After all of the data in data container 200 are coalesced at one end of data container 200, high water mark 202a is adjusted to make unused space 206d reclaimable, i.e., high water mark 202a is moved to exclude space(s) that have been successfully emptied. As shown in FIG. 2, high water mark 202a is moved to the beginning of unused space 206d in data container 200e, which converts unused space 206d into reclaimable space. While high water mark 202a is being adjusted, data container 200 may be locked, i.e., unavailable for DML operations. However, scans may still run concurrently on data container 200. An enlarged reclaimable space 204b is then reclaimed, which results in data container 200f.

Figure 3:
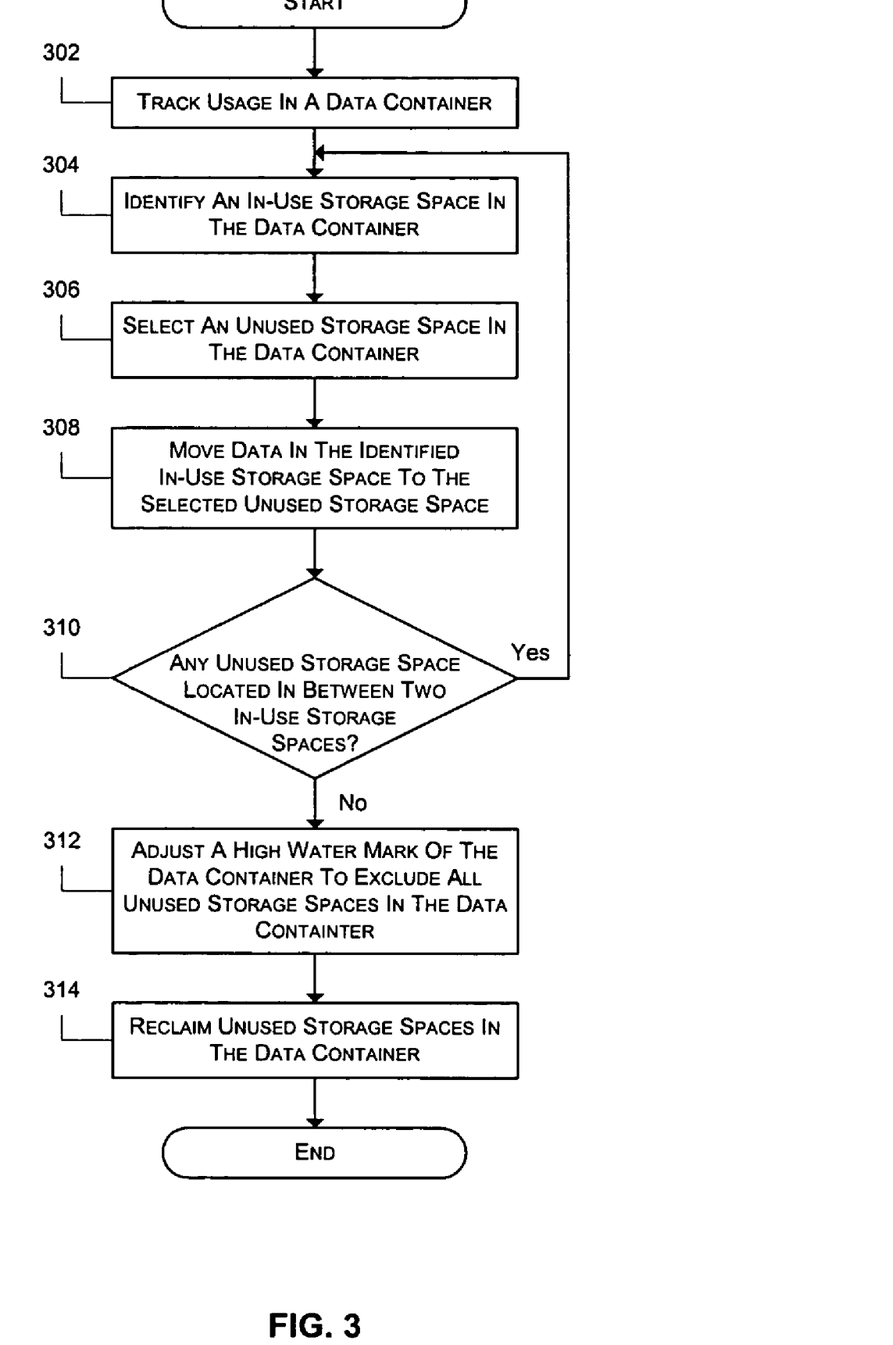
FIG. 3 depicts a flow chart of a method of reclaiming storage space in data storage systems according to another embodiment of the invention.

Depicted in FIG. 3 is a flow chart of a method of reclaiming storage space in data storage systems according to another embodiment of the invention. Usage in a data container is tracked (302). In one embodiment, a bitmap may be used to track usage in the data container. For example, each space in the data container would have a corresponding space on the bitmap. The bitmap then provides information on which portions of the data container are free or unused and which spaces are occupied or in-use.

At 304, an in-use storage space in the data container is identified. The identified in-use storage space may be an in-use storage space closest to a high water mark of the data container. An unused storage space in the data container is selected at 306. The selected unused storage space may be an unused storage space farthest from the high water mark of the data container. Data in the identified in-use storage space are then moved, i.e., copied, relocated, etc., to the selected unused storage space (308).

Movement of data may be implemented in two stages. In one embodiment, the first stage will attempt to move as much data as possible. For instance, if a piece of data is locked, e.g., being accessed by another transaction, the process will skip that piece of data and proceed to move other pieces of data that are unlocked. In the embodiment, the second stage will wait for data to become unlocked in order to move data that was skipped in the first stage. In another embodiment, whenever the process realizes that it is competing against another transaction, e.g., a user transaction, for access to the same piece of data, the process will allow the other transaction to access the data first.

If the identified in-use storage space is emptied as a result of the movement of data to the selected unused storage space, the now empty identified storage space may be marked to prevent the storage space from being used again. In addition, if a bitmap is being maintained for the data container, the bitmap may be updated to indicate that the identified storage space is now empty. Tracking usage as the reclamation process progresses allows the reclamation process to restart where it left off on occasions where the process ends abruptly due to an error.

A determination is made at 310 as to whether any unused storage space in the data container is located in between two in-use storage spaces. If one or more such unused storage spaces remain, the process returns to 304. When none of the unused storage spaces in the data container is located in between two in-use storage spaces, the high water mark of the data container is adjusted to exclude all of the unused storage spaces in the data container (312). The unused storage spaces in the data container are then reclaimed at 314.

Figure 4:
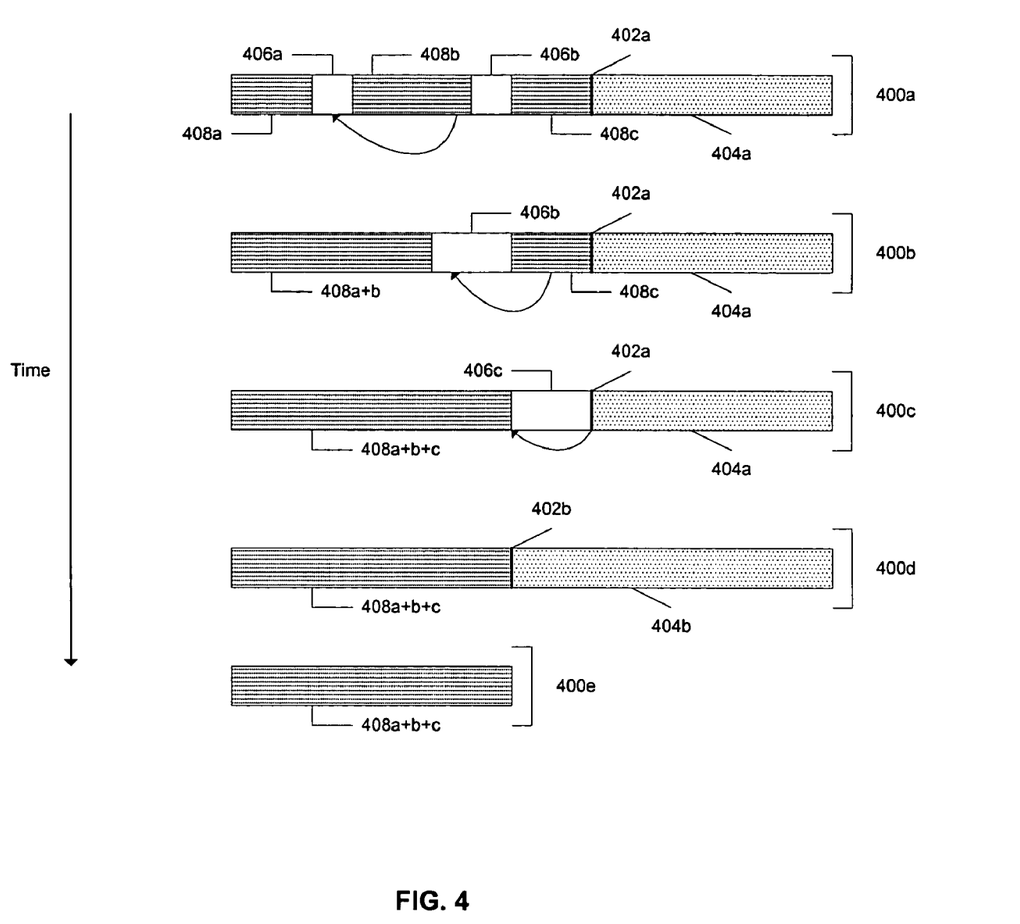
FIG. 4 illustrates another example of how storage space in a data container can be reclaimed.

FIG. 4 is another example of how storage space in a data container can be reclaimed. In the example, a data container 400 comprises a high water mark 402, a reclaimable space 404, two unused storage spaces 406a-406b, and three in-use storage spaces 408a-408c. In the embodiment, instead of moving data in in-use storage space 408c to unused storage space 406a, some of the data in in-use storage space 408b is moved to unused storage space 406a. One reason for moving data in in-use storage space 408b instead of in-use storage space 408c may be due to the fact that in-use storage space 408c is currently locked because it is being accessed by another transaction. Another reason may be due to the fact that data in in-use storage space 408c has to be moved as a whole and not in parts. Movement of some of the data in in-use storage space 408b enlarges unused storage space 406b as shown in data container 400b.

Since unused storage space 406b is now large enough to accommodate all of the data in in-use storage space 408c, all of the data in in-use storage space 408c are moved to unused storage space 406b. A new unused storage space 406c is then created as seen in data container 400c. High water mark 402a can now be adjusted as none of the unused storage spaces in data container 400c is in between two in-use storage spaces. After adjustment of high-water mark 402a to the beginning of unused storage space 406c, reclaimable space 404a enlarges to become reclaimable space 404b. Reclaiming reclaimable space 404b results in data container 400e.

System Architecture Overview

Figure 5:
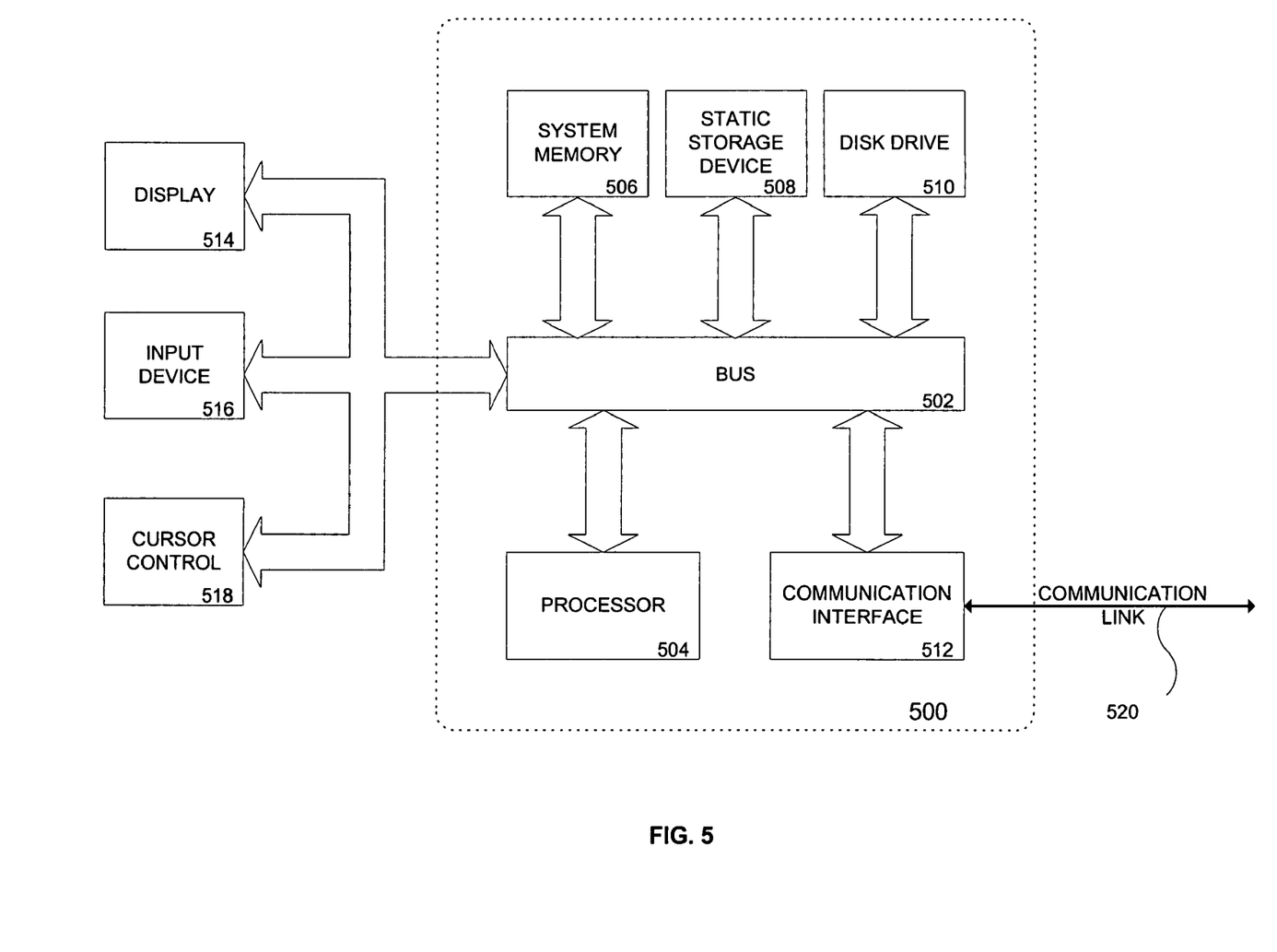
FIG. 5 is a diagram of a computer system with which embodiments of the present invention can be implemented.

FIG. 5 is a block diagram of a computer system 500 suitable for implementing an embodiment of the present invention. Computer system 500 includes a bus 502 or other communication mechanism for communicating information, which interconnects subsystems and devices, such as a processor 504, a system memory 506 (e.g., RAM), a static storage device 508 (e.g., ROM), a disk drive 510 (e.g., magnetic or optical), a communication interface 512 (e.g., modem or ethernet card), a display 514 (e.g., CRT or LCD), an input device 516 (e.g., keyboard), and a cursor control 518 (e.g., mouse or trackball).

According to one embodiment of the invention, computer system 500 performs specific operations by processor 504 executing one or more sequences of one or more instructions contained in system memory 506. Such instructions may be read into system memory 506 from another computer readable medium, such as static storage device 508 or disk drive 510. In alternative embodiments, hard-wired circuitry may be used in place of or in combination with software instructions to implement the invention.

The term "computer readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as disk drive 510. Volatile media includes dynamic memory, such as system memory 506. Transmission media includes coaxial cables, copper wire, and fiber optics, including wires that comprise bus 502. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 500. According to other embodiments of the invention, two or more computer systems 500 coupled by communication link 520 (e.g., LAN, PTSN, or wireless network) may perform the sequence of instructions required to practice the invention in coordination with one another.

Computer system 500 may transmit and receive messages, data, and instructions, including a program, i.e., application code, through communication link 520 and communication interface 512. Received program code may be executed by processor 504 as it is received, and/or stored in disk drive 510, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method of reclaiming storage space in data storage systems, the method comprising:
   compacting data in a data container, wherein the act of compacting the data in the data container is performed by using a processor;
   adjusting a high water mark of the data container and storing, by using a bus, the high water mark adjusted in a tangible computer readable medium or a storage device; and
   reclaiming unused space in the data container, wherein
      the act of compacting comprises moving at least some of the data in an in-use storage space in the data container to an unused storage space farther from the high water mark of the data container, and
      the at least some of the data is compacted without requiring an order within the at least some of the data prior to the act of compacting be maintained.

2. The method of claim 1, wherein the ac of compacting data in a data container further comprises:
   identifying the in-use storage space in the data container; and
   selecting the unused storage space in the data container.

3. The method of claim 2, wherein the act of compacting data in the data container further comprises:
   determining whether any unused storage space in the data container is located in between two in-use storage spaces; and repeating the acts of identifying, selecting, and moving when an unused storage space in the data container is located in between two in-use storage spaces.

4. The method of claim 2, wherein a recently emptied storage space is marked to discourage future usage.

5. The method of claim 2, wherein the identified in-use storage space and the selected unused storage space differ in size.

6. The method of claim 2, wherein the identified in-use storage space is an in-use storage space closest to the high water mark of the data container.

7. The method of claim 2, wherein less than all of the data in the identified in-use storage space is moved to the selected unused storage space.

8. The method of claim 2, wherein the act of moving data in the identified in-use storage space to the selected unused storage space is implemented in two stages.

9. The method of claim 8, wherein only unlocked pieces of data in the identified in-use storage space are moved to the selected unused storage space in the first stage.

10. The method of claim 2, wherein the act of moving data in the identified in-use storage space to the selected unused storage space is executed transactionally and/or incrementally.

11. The method of claim 2, wherein the act of moving data in the identified in-use storage space to the selected unused storage space is carried out at varying levels of granularity.

12. The method of claim 11, wherein the granularity in which data in the identified in-use storage space is moved depends upon the granularity at which a data storage system maintains data integrity.

13. The method of claim 1, wherein data integrity is preserved through the reclamation process.

14. The method of claim 1, wherein only one command needs to be issued to start the reclamation process.

15. The method of claim 1, wherein optimal concurrency is maintained such that the data remains accessible in the data storage systems when the data in the data container is compacted.

16. The method of claim 1, wherein the data in the data container is compacted away from the high water mark of the data container.

17. The method of claim 1, wherein the reclamation process is recoverable and/or restartable.

18. The method of claim 1, wherein act of adjusting the high water mark of the data container comprises:
adjusting the high water mark to exclude all unused storage spaces in the data container.

19. The method of claim 1, further comprising:
tracking usage in the data container.

20. The method of claim 1, in which the act of compacting, the act of adjusting, and the act of reclaiming are performed without requiring extra storage space.

21. The method of claim 1, in which the data remains accessible in the data storage systems during the act of compacting, the act of adjusting, and the act of reclaiming.

22. The method of claim 1, in which a scan-based operation is run concurrently on the data container during the act of adjusting a high water mark.

23. The method of claim 22, in which the data container is unavailable to a data manipulation language operation.

24. The method of claim 1, in which the act of compacting data is performed in parallel with a scan-based operation or a data manipulation language (DML) operation.

25. The method of claim 1, in which the act of compacting, the act of adjusting, or the act of reclaiming is recoverable.

26. The method of claim 1, in which the act of moving data in an in-use storage space comprises moving part of a contiguous portion of the data in the in-use storage space in the data container to the unused storage space.

27. A computer program product that includes a computer readable medium, the computer readable medium being a volatile or non-volatile medium, the computer readable medium comprising a plurality of instructions which, when executed by a processor, causes the process to execute a process for reclaiming storage space in data storage systems, the process comprising:
compacting data in a data container;
adjusting a high water mark of the data container; and
reclaiming unused space in the data container, wherein
the act of compacting comprises moving at least some of the data in an in-use storage space in the data container to an unused storage space farther from the high water mark of the data container, and
the at least some of the data is compacted without requiring an order within the at least some of the data prior to the act of compacting be maintained.

28. The computer program product of claim 27, wherein the act of moving data in the in-use storage space to the unused storage space is carried out at varying levels of granularity.

29. The computer program product of claim 28, wherein the granularity in which data in the in-use storage space is moved depends upon the granularity at which a data storage system maintains data integrity.

30. The computer program product of claim 27, wherein data integrity is preserved through the reclamation process.

31. The computer program product of claim 27, wherein only one command needs to be issued to start the reclamation process.

32. The computer program product of claim 27, wherein optimal concurrency is maintained such that the data remains accessible in the data storage systems when the data in the data container is compacted.

33. The computer program product of claim 27, wherein the reclamation process is recoverable and/or restartable.

34. A system for reclaiming storage space in data storage systems, the system comprising:
means for compacting data in a data container;
means for adjusting a high water mark of the data container; and
means for reclaiming unused space in the data container; wherein
the means for compacting is configured to move at least some of the data in an in-use storage space in the data container to an unused storage space farther from the high water mark of the data container, thereby compacting the at least some of the data without requiring an order within the at least some of the data prior to the act of compacting be maintained.

35. The system of claim 34, wherein the means for compacting data compacts the data such that integrity is preserved.

36. The system of claim 34, further comprising means for receiving one command for starting the process.

37. The system of claim 34, wherein the means for compacting compacts the data such that optimal concurrency is maintained such that the data remains accessible in the data storage systems when the data in the data container is compacted.

38. A method of reclaiming storage space in data storage systems, the method comprising:

compacting data in a data container, wherein the act of compacting the data in the data container is performed by using a processor;

adjusting a high water mark of the data container and storing, by using a bus, the high water mark adjusted in a tangible computer readable medium or a storage device; and reclaiming unused space in the data container, wherein
the act of compacting comprises dividing data in an in-use storage space into different portions, and moving at least some of the portions to different respective unused storage space in the data container and is performed without requiring an order within the at least some of the portions of the data prior to the act of compacting be maintained, and optimal concurrency is maintained such that the data remains accessible in the data storage systems when the data in the data container is compacted.

39. The method of claim 38, wherein the act of moving comprises moving only unlocked data portions.

40. The method of claim 39, further comprising moving locked data portions after they are unlocked.

41. The method of claim 38, wherein the act of moving data in the in-use storage space is executed transactionally and/or incrementally.

42. The method of claim 38, wherein the act of moving data is carried out at varying levels of granularity.

43. The method of claim 38, wherein data integrity is preserved through the reclamation process.

44. The method of claim 38, wherein the reclamation process is recoverable and/or restartable.

45. The method of claim 38, wherein the act of adjusting the high water mark of the data container comprises:
adjusting the high water mark to exclude all unused storage spaces in the data container.

46. The method of claim 38, wherein the compacted data has an order that is different from an order of the data in the data container before the data is compacted.

47. The method of claim 38, in which the act of compacting, the act of adjusting, and the act of reclaiming are performed without requiring extra storage space.

48. The method of claim 38, in which the data remains accessible in the data storage systems during the act of compacting, the act of adjusting, and the act of reclaiming.

49. The method of claim 38, in which a scan-based operation is run concurrently on the data container during the act of adjusting a high water mark.

50. The method of claim 49, in which the data container is unavailable to a data manipulation language operation.

51. The method of claim 38, in which the act of compacting data is performed in parallel with a scan-based operation or a data manipulation language (DML) operation.

52. The method of claim 38, in which the act of compacting, the act of adjusting, or the act of reclaiming is recoverable.

53. A computer program product that includes a computer readable medium, the computer readable medium being a volatile or non-volatile medium, the computer readable medium comprising a plurality of instructions which, when executed by a processor, causes the process to execute a process for reclaiming storage space in data storage systems, the process comprising:
compacting data in a data container;
adjusting a high water mark of the data container; and
reclaiming unused space in the data container, wherein
the act of compacting comprises dividing data in an in-use storage space into different portions, and moving at least some of the portions to different respective unused storage space in the data container and is performed without requiring an order within the at least some of the portions of the data prior to the act of compacting be maintained.

54. The computer program product of claim 53, wherein the act of moving comprises moving only unlocked data portions.

55. The computer program product of claim 54, the process further comprising moving locked data portions after they are unlocked.

56. The computer program product of claim 53, wherein the act of moving data in the in-use storage space is executed transactionally and/or incrementally.

57. A system for reclaiming storage space in data storage systems, the system comprising:
means for compacting data in a data container;
means for adjusting a high water mark of the data container; and
means for reclaiming unused space in the data container, wherein
the means for compacting is configured to divide data in an in-use storage space into different portions, and move at least some of the portions to different respective unused storage space in the data container and is performed without requiring an order within the at least some of the portions of the data prior to the act of compacting be maintained.

58. The system of claim 57, wherein the means for moving is configured to move only unlocked data portions.

59. The system of claim 57, wherein the means for compacting moves the portions in the in-use storage space transactionally and/or incrementally.

60. A computer program product that includes a compute readable medium, the computer readable medium being a volatile or non-volatile medium, the computer readable medium comprising a plurality of instructions which, when executed by a processor, causes the process to execute a process for reclaiming storage space in data storage systems, the process comprising:
compacting data in a data container;
adjusting a high water mark of the data container; and
reclaiming unused space in the data container, wherein
the act of compacting comprises moving some of the data in an in-use storage space in the data container to an unused storage space farther from the high water mark of the data container, and
the at least some of the data is compacted without requiring an order of the at least some of the data prior to the act of compacting be maintained.

61. A system for reclaiming storage space in data storage systems, the system comprising:
means for compacting data in a data container;
means for adjusting a high water mark of the data container; and
means for reclaiming unused space in the data container, wherein
the means for compacting comprises means for moving at least some of the data in an in-use storage space in the data container to an unused storage space farther from the high water mark of the data container, and
the at least some of the data is compacted without requiring an order of the at least some of the data prior to the act of compacting be maintained.

* * * * *

UNITED STATES PATENT AND TRADEMARK OFFICE
CERTIFICATE OF CORRECTION

PATENT NO. : 7,587,568 B2  Page 1 of 1
APPLICATION NO. : 10/877158
DATED : September 8, 2009
INVENTOR(S) : Muthulingam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this

Twenty-first Day of September, 2010

David J. Kappos
*Director of the United States Patent and Trademark Office*